United States Patent
Ozawa

(10) Patent No.: US 8,939,567 B2
(45) Date of Patent: *Jan. 27, 2015

(54) INK FOR INKJET RECORDING APPARATUS, AND IMAGE FORMING METHOD

(75) Inventor: Noriaki Ozawa, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 264 days.

This patent is subject to a terminal disclaimer.

(21) Appl. No.: 13/559,312

(22) Filed: Jul. 26, 2012

(65) Prior Publication Data

US 2013/0027485 A1 Jan. 31, 2013

(30) Foreign Application Priority Data

Jul. 29, 2011 (JP) ................. 2011-167670

(51) Int. Cl.
| | |
|---|---|
| *B41J 2/01* | (2006.01) |
| *C09D 11/38* | (2014.01) |
| *B41J 2/21* | (2006.01) |
| *C09D 11/322* | (2014.01) |

(52) U.S. Cl.
CPC ............... *C09D 11/38* (2013.01); *B41J 2/2107* (2013.01); *C09D 11/322* (2013.01)
USPC .......................................... 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC .................. 347/100, 95, 96, 101, 102, 88, 99; 106/31.6, 31.13; 523/160, 161

See application file for complete search history.

(56) References Cited

U.S. PATENT DOCUMENTS

| | | | |
|---|---|---|---|
| 5,656,071 A | 8/1997 | Kappele et al. | |
| 5,772,746 A * | 6/1998 | Sawada et al. | ............... 106/31.6 |
| 6,102,996 A * | 8/2000 | Parazak | ........................ 106/31.6 |

(Continued)

FOREIGN PATENT DOCUMENTS

| | | |
|---|---|---|
| CN | 101378912 B | 12/2010 |
| JP | 6-157959 A | 6/1994 |

OTHER PUBLICATIONS

Office Action issued to U.S. Appl. No. 13/770,891, mailed Dec. 4, 2013.

(Continued)

*Primary Examiner* — Manish S Shah
(74) *Attorney, Agent, or Firm* — Knobbe Martens Olson & Bear, LLP

(57) ABSTRACT

Water and a pigment, as well as a high penetrating agent, a penetrating agent and a moisturizing agent each having specific kind and amount are incorporated in an ink for an inkjet recording apparatus. The high penetrating agent is an alkyl-substituted 1,3-hexanediol or an alkyl-substituted 1,3-pentanediol each having 8 carbon atoms. The penetrating agent is a C1-C4 monoalkyl ether of a polyhydric alcohol, a C6-C8 monoalkyl ether of a polyhydric alcohol, or a polyhydric alcohol dibutyl ether. The moisturizing agent is glycerin and 1,3-propanediol.

8 Claims, 4 Drawing Sheets

(56) References Cited

U.S. PATENT DOCUMENTS

| | | | |
|---|---|---|---|
| 6,136,890 A * | 10/2000 | Carlson et al. | 523/160 |
| 2005/0235870 A1 * | 10/2005 | Ishihara | 347/100 |
| 2010/0265292 A1 | 10/2010 | Ohshima et al. | |
| 2013/0027485 A1 | 1/2013 | Ozawa et al. | |

OTHER PUBLICATIONS

Office Action issued Dec. 17, 2013 in corresponding Chinese Application No. 201210232656.7.

* cited by examiner

INK FOR INKJET RECORDING APPARATUS, AND IMAGE FORMING METHOD

INCORPORATION BY REFERENCE

This application is based upon and claims the benefit of priority from the corresponding Japanese Patent Application No. 2011-167670, filed in the Japan Patent Office on Jul. 29, 2011, the entire contents of which are incorporated herein by reference.

FIELD

The present disclosure relates to an ink for an inkjet recording apparatus, and to an image forming method.

BACKGROUND

In recent years, inkjet recording apparatuses that form images by an inkjet recording system are widely used as image forming apparatuses since high-definition image qualities that are comparable to those of silver halide photographs can be obtained due to rapid advances in recording technologies.

In such inkjet recording apparatuses, improvement of an image forming velocity is strongly desired. However, in some cases when an image is formed at a high-speed in an inkjet recording apparatus, a recording medium such as paper bearing an ink passes through an ejection roller and is ejected before the ink has penetrated into the recording medium, and the ink adheres to the ejection roller (offset). In such cases, image defect easily occurs on the formed image. In order to suppress the occurrence of offset, decreasing of the amount of the ejected ink is considered, but in such case, it is difficult to form an image having a sufficient density.

In order to suppress the occurrence of offset, it is also effective to increase the penetrability of an ink into a recording medium. As an ink for an inkjet recording apparatus which is excellent in penetrability into a recording medium and can form a fine image, for example, an aqueous ink including a colorant that is dispersed or dissolved in water, water and a wetting agent, and further including 2-ethyl-1,3-hexanediol is exemplified.

In the above-mentioned ink, 2-ethyl-1,3-hexanediol is used as a component for improving the penetrability of the ink into a recording medium. However, in the above-mentioned ink, in some cases when the content of the 2-ethyl-1,3-hexanediol is small, the penetrability of the ink into a recording medium cannot be enhanced sufficiently, and pollution of the recording medium by offset may be caused. Furthermore, in the above-mentioned ink, in the case when the content of the 2-ethyl-1,3-hexanediol is high, the penetrability of the ink into a recording medium is too high, which leads to a problem that the colorant penetrates into the inside of the recording medium together with the liquid components included in the ink, and thus a formed image has a lower image density than a suitable value.

Furthermore, in the above-mentioned ink, the characteristics of the ink such as thickening are readily changed depending on the kind and amount of the wetting agent, when an image is formed after ejection of the ink from a recording head has been stopped for a while. In this case, the ejection of ink droplets from the recording head may readily become unstable, and image turbulence may readily occur on a formed image. Furthermore, the above-mentioned ink has a problem that, in the case when a recording head in which the ink is filled has been left for a long period, the wetting agent may be solidified in the recording head or significant thickening of the ink may be caused depending on the kind of the wetting agent, thereby the state of ejection of the ink droplets cannot be recovered to the state before the leaving by recovery operations in which purging and wiping are conducted against the recording head.

SUMMARY

The present disclosure has been made in view of such circumstances, and aims at providing an ink for an inkjet recording apparatus that can suppress the image turbulence in the case when an image is formed after ejection of the ink from a recording head has been stopped for a while, by which the state of ejection of the ink droplets from the recording head can be readily recovered to a fine state even in the case when the recording head in which the ink is filled has been left for a long period, and can balance suppression of the occurrence of offset and forming of an image having a desired image density. Furthermore, the present disclosure aims at providing an image forming method by an inkjet recording apparatus using the above-mentioned ink for an inkjet recording apparatus.

An ink for an inkjet recording apparatus according to an aspect of the present disclosure includes at least water, a pigment, a high penetrating agent, a penetrating agent and a moisturizing agent, wherein the high penetrating agent is an alkyl-substituted 1,3-hexanediol or an alkyl-substituted 1,3-pentanediol each having 8 carbon atoms, the content of the high penetrating agent in the ink is 0.5 to 2.5% by mass, the penetrating agent is a C1-C4 monoalkyl ether of a polyhydric alcohol, a C6-C8 monoalkyl ether of a polyhydric alcohol, or a polyhydric alcohol dibutyl ether, the total amount of the contents of the high penetrating agent and penetrating agent in the ink is 2 to 5.5% by mass in the case when the penetrating agent is the C1-C4 monoalkyl ether of a polyhydric alcohol, or 1.5 to 2.5% by mass in the case when the penetrating agent is the C6-C8 monoalkyl ether of a polyhydric alcohol, or the polyhydric alcohol dibutyl ether, the moisturizing agent is glycerin and 1,3-propanediol, and the content of the glycerin in the ink is 5% by mass or more, and the content of the 1,3-propanediol in the ink is 10 to 30% by mass.

Furthermore, a method for forming an image of another aspect of the present disclosure includes forming an image by an inkjet recording apparatus using the above-mentioned ink for an inkjet recording apparatus.

DETAILED DESCRIPTION OF EMBODIMENTS

Figure 1:
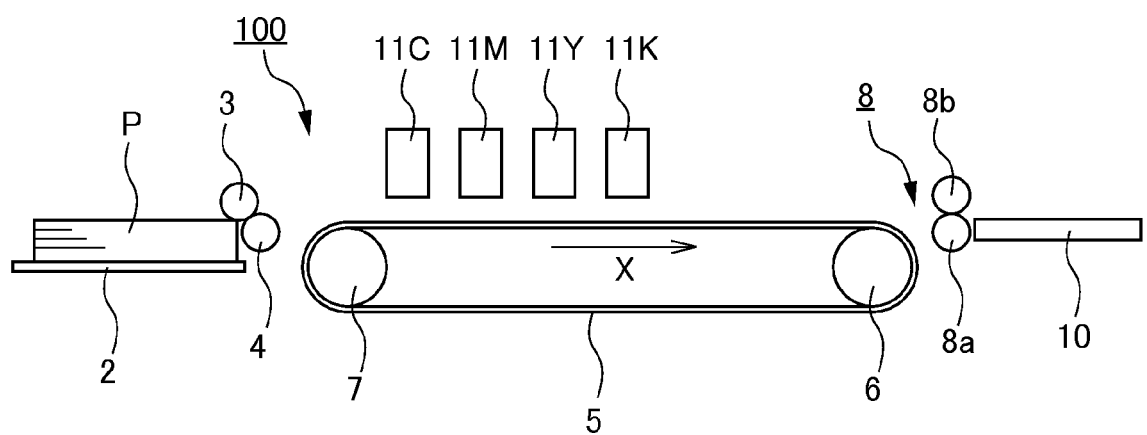
FIG. 1 is a cross-sectional view showing the structure of an inkjet recording apparatus including a line head-type recording system.

Hereinafter exemplary embodiments of the present disclosure are explained in detail, but the present disclosure is not limited at all to the following exemplary embodiments and may be carried out with appropriately making a change suitably within the scope of the object of the present disclosure. For some parts on which explanations are overlapped, one of the explanations is suitably omitted, which is not construed to limit the gist of the disclosure.

First Exemplary Embodiment

The first exemplary embodiment relates to an ink for an inkjet recording apparatus including at least water, a pigment, a high penetrating agent, a penetrating agent and a moisturizing agent, which includes an alkyl-substituted 1,3-hexanediol or an alkyl-substituted 1,3-pentanediol each having 8 carbon atoms as the high penetrating agent and includes a C1-C4 monoalkyl ether of a polyhydric alcohol, a C6-C8 monoalkyl ether of a polyhydric alcohol, or a polyhydric alcohol dibutyl ether as the penetrating agent, in which the content of the high penetrating agent and the total amount of the contents of the high penetrating agent and penetrating agent are each within a specific range, and which includes specific amounts of glycerin and 1,3-propanediol as the moisturizing agent.

The ink for an inkjet recording apparatus (hereinafter also simply described as "ink") according to the first exemplary embodiment may optionally include a dissolution stabilizer that stabilizes the dissolution state of the components included in the ink. Hereinafter the water, pigment, high penetrating agent, penetrating agent, moisturizing agent and dissolution stabilizer which are the essential or optional components included in the ink for an inkjet recording apparatus, and the method for the production of the ink for an inkjet recording apparatus will be explained in order.

(Water)

The ink for an inkjet recording apparatus is an aqueous ink that essentially includes water. The water included in the ink is not specifically limited within a scope in which the object of the present disclosure is not inhibited, and water having a desired purity can suitably be selected from waters that have been conventionally used in the production of aqueous inks and used. The content of the water in the ink for an inkjet recording apparatus is not specifically limited within a scope in which the object of the present disclosure is not inhibited. The content of the water is suitably changed in accordance with the use amount of the other components mentioned below. A typical content of the water in the ink is preferably from 20 to 70% by mass, more preferably from 30 to 60% by mass with respect to the total mass of the ink.

(Pigment)

The ink for an inkjet recording apparatus essentially includes a pigment. The ink for an inkjet recording apparatus includes the pigment generally as a pigment dispersion in which the pigment is dispersed by a resin. The pigment that can be included in the pigment dispersion is not specifically limited within a scope in which the object of the present disclosure is not inhibited, and can be selected from pigments that have been conventionally used as colorants in inks for an inkjet recording apparatus, and used. Specific examples of preferable pigments may include yellow pigments such as C. I. Pigment Yellow 93, 95, 109, 110, 120, 128, 138, 139, 151, 154, 155, 173, 180, 185 and 193, orange pigments such as C. I. Pigment Orange 34, 36, 43, 61, 63 and 71, red pigments such as C. I. Pigment Red 122 and 202, blue pigments such as C. I. Pigment Blue 15, purple pigments such as C. I. Pigment Violet 19, 23 and 33, black pigments such as C. I. Pigment Black 7, and the like.

The amount of the pigment included in the pigment dispersion is not specifically limited within a scope in which the object of the present disclosure is not inhibited. A typical content of the pigment in the ink is preferably 2 to 15% by mass, more preferably 4 to 9.5% by mass with respect to the total mass of the ink. When the use amount of the pigment is excessively small, an image having a desired image density is difficult to be obtained. When the use amount of the pigment is excessively large, it may become difficult to form a fine image due to lack of the fluidity of the ink, or offset may easily occur due to lack of the penetrability of the ink into the recording medium.

The resin included in the pigment dispersion is not specifically limited within a scope in which the object of the present disclosure is not inhibited, and can suitably be selected from various resins that have been conventionally used in the production of pigment dispersions and used. Specific examples of preferable resins may include styrene-acrylic acid-alkyl acrylate ester copolymers, styrene-acrylic acid copolymers, styrene-maleic acid copolymers, styrene-maleic acid-alkyl acrylate ester copolymers, styrene-methacrylic acid copolymers, styrene-alkyl methacrylate ester copolymers, styrene-maleic acid half ester copolymers, vinylnaphthalene-acrylic acid copolymers, vinylnaphthalene-maleic acid copolymers and the like. Among these resins, styrene-acrylic resins including units derived from styrene and units derived from acrylic acid, methacrylic acid, an acrylic acid ester or a methacrylic acid ester such as styrene-acrylic acid-alkyl acrylate ester copolymers, styrene-acrylic acid copolymers, styrene-maleic acid-alkyl acrylate ester copolymers, styrene-methacrylic acid copolymers and styrene-alkyl methacrylate ester copolymers are preferable since they are prepared easily and are excellent in effect of dispersing pigments. The above-mentioned resins are obtained by radical polymerization.

The weight average molecular weight (Mw) of the resin used in the preparation of the pigment dispersion is not specifically limited within a scope in which the object of the present disclosure is not inhibited, and typically, the weight average molecular weight (Mw) of the resin is preferably from 10,000 to 160,000. In the case when the molecular weight of the resin is excessively small, an image having a desired image density is difficult to be obtained in the formation of an image on the recording medium. Furthermore, in the case when the molecular weight of the resin is excessively high, the ink has a high viscosity, and thus the viscosity of the ink may be readily increased due to volatilization of the solvent or the like and ejection failure of the ink from a nozzle may readily occurs. Therefore, in the case when the molecular weight of the resin is excessively high, a fine image is difficult to be formed. For example, the molecular weight of the resin can be adjusted according to a known method for adjusting the use amount of a polymerization initiator, a polymerization temperature, a polymerization time, or the like. The weight average molecular weight (Mw) of the resin included in the pigment dispersion can be measured by gel filtration chromatography.

The use amount of the resin in the preparation of the pigment dispersion is not specifically limited within a scope in which the object of the present disclosure is not inhibited. A typical use amount of the resin is preferably 15 to 100 parts by mass with respect to 100 parts by mass of the pigment.

The method for producing the pigment dispersion including the pigment and resin is not specifically limited within a scope in which the object of the present disclosure is not inhibited, and can suitably be selected from conventionally-known methods. An example of a preferable method may include a method including kneading a pigment and a resin in a medium of a suitable liquid such as water to form a pigment dispersion by using a media-type wet dispersing machine such as a Nano Grain Mill (manufactured by Asada Tekko), an MSC Mill (manufactured by Mitsui Mining Co., Ltd.), a Dyno Mill (manufactured by Shinmaru Enterprises Corporation) and a sand mill (manufactured by Yasukawa Seisakusho Co., Ltd.). In a treatment by the media-type wet dispersing machine, beads having a small diameter are used so as to pulverize and disperse the pigment. The particle size of the beads is not specifically limited, and is typically a particle size of 0.5 to 2.0 mm. Furthermore, the material of the beads is not specifically limited, and a hard material such as zirconia and glass is used.

The use amount of the liquid medium in the production of the pigment dispersion is not specifically limited as long as the pigment and resin can be kneaded finely. Typically, the use amount of the liquid medium is preferably 1 to 10-fold mass, more preferably 2 to 8-fold mass with respect to the total mass of the pigment and resin.

The volume average particle size of the pigment included in the pigment dispersion is preferably 30 to 200 nm, more preferably 50 to 130 nm, from the viewpoints of the color density and hue of the ink, the stability of the ink and the like. The volume average particle size of the pigment can be adjusted by adjusting the particle diameter of the beads and the treatment time during the kneading of the pigment and resin. In the case when the volume average particle size is excessively small, the image density of a formed image may be lower than a desired value. In the case when the volume average particle size is excessively large, clogging of a nozzle for ejecting the ink may occur, or the ejection performance of the ink may be deteriorated. The volume average particle size of the pigment can be measured, for example, by a dynamic light scattering particle size distribution measurement apparatus (manufactured by Sysmex Corporation) or the like by using a sample obtained by diluting a pigment dispersion to 300-fold with ion exchanged water.

(High Penetrating Agent)

The ink for an inkjet recording apparatus essentially includes a high penetrating agent. The high penetrating agent is an alkyl-substituted 1,3-hexanediol or an alkyl-substituted 1,3-pentanediol each having 8 carbon atoms.

Since the high penetrating agent has a low surface tension, the high penetrating agent can decrease the surface tension of the ink. Therefore, in the case when an ink including the high penetrating agent is used, the ink penetrates quickly and suitably into a recording medium, thereby an image having a desired image density can be formed while the pollution of the recording medium due to offset is suppressed. Furthermore, the high penetrating agent has a high boiling point. Therefore, volatilization is suppressed in the ink including the high penetrating agent, and the characteristics of the ink are difficult to be changed even in the case when ejection of the ink from a head is stopped for a while. Furthermore, since the high penetrating agent is substituted by an alkyl, the high penetrating agent has a branched chain form and thus is difficult to crystallize as compared to linear alkanediols. Therefore, for example, in the case when printing is not conducted for a long period such as from one month to several months, the high penetrating agent is difficult to be solidified in the ink. Therefore, in the case when the ink including the high penetrating agent is used, even if the ink is left for a long period in a state in which the ink is filled in a recording head, the high penetrating agent in the ink is not solidified in the recording head, and the state of ejection of the ink from the recording head can be readily recovered to the state before the leaving by recovery operations in which purging and wiping are conducted.

Specific preferable examples of the high penetrating agent may include 2-ethyl-1,3-hexanediol and 2,2,4-trimethyl-1,3-pentanediol. The alkyl group that is the substituent in the high penetrating agent binds to a carbon atom. Furthermore, two or more kinds of high penetrating agents can be used in combination.

The content of the high penetrating agent in the ink is 0.5 to 2.5% by mass. In the case when the content of the high penetrating agent is excessively small, the penetrability of the ink into the recording medium cannot be increased sufficiently, and thus pollution of the recording medium due to offset may occur easily. In the case when the content of the high penetrating agent is excessively large, the penetrability of the ink into the recording medium becomes too high, and the pigment readily penetrates into the inside of the recording medium together with the liquid components in the ink. Therefore, in the case when an ink including a large amount of the high penetrating agent is used, an image having a desired image density may be difficult to be formed. Furthermore, in the case when the content of the high penetrating agent is excessively large, the high penetrating agent in the ink may be easily solidified in a recording head in which the ink is filled, in the case when the recording head is left for a long period. In such case, even recovery operations in which purging and wiping are conducted are conducted for the recording head, the solidified high penetrating agent is difficult to be dissolved and removed, and thus the state of ejection of the ink from the recording head is difficult to be recovered to the state before the leaving.

(Penetrating Agent)

The ink for an inkjet recording apparatus essentially includes a penetrating agent besides the high penetrating agent. The penetrating agent is a C1-C4 monoalkyl ether of a polyhydric alcohol, a C6-C8 monoalkyl ether of a polyhydric alcohol, or a polyhydric alcohol dibutyl ether.

In the case when the penetrability of the ink into the recording medium is increased by only the high penetrating agent, the content of the high penetrating agent in the ink is increased. In such case, the above-mentioned failures may easily occur. Therefore, the high penetrating agent and penetrating agent are used in combination for the purpose of compensating the effect of improving the penetrability by using the high penetrating agent that is used in an amount within a suitable range.

The penetrating agent is an ether of a polyhydric alcohol, and examples are ethers of polyhydric alcohols such as oligo or polyethylene glycols such as polyethylene glycol, diethylene glycol and triethylene glycol; oligo or polypropylene glycols such as polypropylene glycol, dipropylene glycol and tripropylene glycol; alkylene glycols such as ethylene glycol, propylene glycol, butylene glycol, 1,3-butanediol and 1,5-pentanediol; alkanetriols such as 1,2,6-hexanetriol; thiodiglycol; and glycerin. Among these ethers of polyhydric alcohols, ethers of diethylene glycol, or ethers of triethylene glycol are preferable.

Specific examples of the case when the penetrating agent is the C1-C4 monoalkyl ether of a polyhydric alcohol may include diethylene glycol monomethyl ether, triethylene glycol monobutyl ether and the like. Specific examples in the case when the penetrating agent is the C6-C8 monoalkyl ether of a polyhydric alcohol may include diethylene glycol monohexyl ether, diethylene glycol mono-2-ethylhexyl ether and the like. Specific examples in the case when the penetrating agent is the polyhydric alcohol dibutyl ether may include diethylene glycol dibutyl ether.

In the case when the penetrating agent is the C1-C4 monoalkyl ether of a polyhydric alcohol, the content thereof in the ink is such an amount that the total amount of the contents of the high penetrating agent and penetrating agent becomes 2 to 5.5% by mass. Furthermore, in the case when the penetrating agent is the C6-C8 monoalkyl ether of a polyhydric alcohol, or the polyhydric alcohol dibutyl ether, the content thereof in the ink is such an amount that the total amount of the contents of the high penetrating agent and penetrating agent becomes 1.5 to 2.5% by mass. In the case when the total amount of the contents of the high penetrating agent and penetrating agent is excessively small, the recording medium is difficult to get wet by the ink and the ink is difficult to penetrate into the recording medium, and thus an image having a desired image density may be difficult to be formed. Furthermore, in the case when the total amount of the contents of the high penetrating agent and penetrating agent is excessively small, the ink may be difficult to penetrate into the recording medium, and thus pollution of the recording medium due to offset may occur easily. In the case when the total amount of the contents of the high penetrating agent and penetrating agent is too large, the penetrability of the ink into the recording medium may become too high, and the pigment may easily penetrate into the inside of the recording medium together with the liquid components in the ink. Therefore, in the ink including the penetrating agent in a large amount, an image having a desired image density may be difficult to be formed.

Furthermore, the ink for an inkjet recording apparatus may include other organic solvent other than the above-mentioned penetrating agent in an amount within a range in which the object of the present disclosure is not inhibited, for the purposes of adjusting the penetrability of the ink into the recording medium, and the like. Specific examples of the other organic solvent other than the above-mentioned penetrating agent which can be incorporated in the ink may include a 1,2-alkanediol having 6 to 8 carbon atoms such as 1,2-hexylene glycol.

(Moisturizing Agent)

The moisturizing agent is a component that suppresses the volatilization of the liquid components from the ink to stabilize the viscosity of the ink. The ink for an inkjet recording apparatus includes glycerin and 1,3-propanediol as the moisturizing agent. The content of the glycerin in the ink is 5% by mass or more, more preferably 5 to 10% by mass with respect to the total mass of the ink. Furthermore, the content of the 1,3-propanediol in the ink is 10 to 30% by mass, more preferably 15 to 25% by mass with respect to the total mass of the ink.

Furthermore, the ink for an inkjet recording apparatus may include a moisturizing agent other than the glycerin and 1,3-propanediol in an amount within a range in which the object of the present disclosure is not inhibited. Specific examples of the moisturizing agent other than the glycerin and 1,3-propanediol which can be incorporated in the ink may include polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol and the like. These moisturizing agents may be used by one kind alone, or as a combination of two or more kinds.

The total amount of the contents of the moisturizing agents is preferably 15 to 50% by mass, more preferably 15 to 40% by mass, with respect to the total mass of the ink.

(Dissolution Stabilizer)

The dissolution stabilizer is a component that compatibilizes the components included in the ink to stabilize the dissolution state of the ink. Specific examples of the dissolution stabilizer may include 2-pyrrolidone, N-methyl-2-pyrrolidone and -butyrolactone, and the like. These dissolution stabilizers may be used by combining two or more kinds. In the case when the ink includes the dissolution stabilizer, the content of the dissolution stabilizer is preferably 1 to 20% by mass, more preferably 3 to 15% by mass with respect to the total mass of the ink.

(Method for Production of Ink for Inkjet Recording Apparatus)

The method for the production of the ink for an inkjet recording apparatus is not specifically limited as long as the dissolution stabilizer and the like can optionally be added to the water, pigment dispersion, high penetrating agent, penetrating agent and moisturizing agent and these ink components can be mixed homogeneously. A specific example of the method for the production of the ink for an inkjet recording apparatus may include a method including homogeneously mixing the respective components for the ink by a mixer, and removing contaminants and coarse particles by a filter having a pore diameter of 10 µm or less. In addition, during the production of the ink for an inkjet recording apparatus, various additives that have been conventionally added to inks for an inkjet recording apparatus such as a surfactant, an antioxidant, a viscosity adjusting agent, a pH adjusting agent, an antisepsis/antifungal agent can optionally be added to the water, pigment dispersion, high penetrating agent, penetrating agent and moisturizing agent.

According to the ink for an inkjet recording apparatus of the first exemplary embodiment explained above, the turbulence of an image in the case when the image is formed after the ejection of the ink from a recording head has been stopped for a while can be suppressed, the state of ejection of the ink droplets from the recording head can be readily recovered to a fine state even in the case when the recording head in which the ink is filled has been left for a long period, and suppression of the occurrence of offset and formation of an image having a desired image density can be balanced. Therefore, the ink for an inkjet recording apparatus according to the first exemplary embodiment can be preferably used in various inkjet recording apparatuses.

Second Exemplary Embodiment

The second exemplary embodiment relates to a method for forming an image including forming an image by an inkjet recording apparatus by using the ink for an inkjet recording apparatus according to the first exemplary embodiment. The recording system of the inkjet recording apparatus used in the image forming method of the second exemplary embodiment is not specifically limited, and may be a serial type in which recording is conducted by a recording head scanning on a recording medium, or a line head-type in which recording is conducted by a recording head fixed on the main body of the apparatus. The inkjet recording apparatus used in the image forming method according to the second exemplary embodiment is preferably a recording apparatus including a line head-type recording head, more preferably a recording apparatus including a long line head that is disposed in the direction vertical to the direction to which the recording medium is conveyed, in view of the high-speed image formation.

In the case when an inkjet recording apparatus of a line head-type recording system is used, since overlapped images are not drawn, it is necessary to increase the ejection amount of the ink in order to form an image having a desired image density. In this case, pollution of the recording medium due to offset may specifically easily occur. However, according to the image forming method according to the second exemplary embodiment, since the ink for an inkjet recording apparatus according to the first exemplary embodiment is used, suppression of the pollution of the recording medium by offset and formation of an image having a desired image density can be balanced. Furthermore, according to the image forming method according to the second exemplary embodiment, since the ink for an inkjet recording apparatus according to the first exemplary embodiment is used, the turbulence of an image in the case when the image is formed after the ejection of the ink from a recording head has been stopped for a while can be suppressed, the state of ejection of the ink droplets from the recording head can be readily recovered to a fine state even in the case when the recording head in which the ink is filled has been left for a long period.

Figure 2:
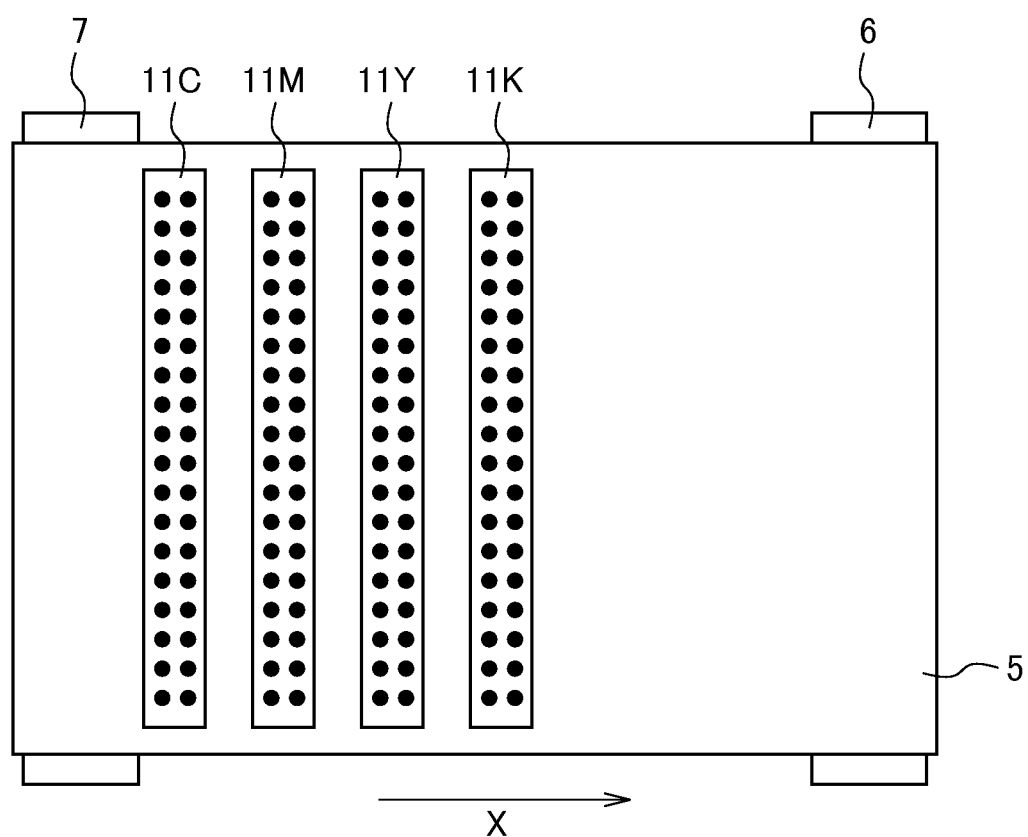
FIG. 2 is a plane view in which the conveyor belt of the inkjet recording apparatus shown in FIG. 1 is seen from the upper side.

Hereinafter the image forming method of the second exemplary embodiment is explained with referring to drawings, with respect to the case when an inkjet recording apparatus of a line head-type recording system is used and a recording paper is used as the recording medium. FIG. 1 is a cross-sectional view showing the structure of an inkjet recording apparatus of a line head-type recording system, and FIG. 2 is a plane view in which the conveyor belt of the inkjet recording apparatus shown in FIG. 1 is seen from the upper side.

As shown in FIG. 1, a paper feeding tray 2 (paper feeding part) for housing a recording paper P is disposed on the left side part of an inkjet recording apparatus 100. On one end of the paper feeding tray 2 are disposed a paper feeding roller 3 that is configured to feed and convey the housed recording paper P sequentially sheet by sheet from the uppermost recording paper P to a conveyor belt 5 mentioned below, and a driven roller 4 that pressure-contacts with the paper feeding roller 3, and is rotated by the paper feeding roller 3.

A conveyor belt 5 was disposed rotatably on the downstream side in the paper conveying direction X (the right side in FIG. 1) of the paper feeding roller 3 and driven roller 4. The conveyor belt 5 is disposed over a belt driving roller 6 that is disposed on the downstream side of the paper conveying direction X and a belt roller 7 disposed on the upper stream side which is rotated by the belt driving roller 6 through the conveyor belt 5. The recording paper P is conveyed in the direction of the arrow X by the rotation driving of the belt driving roller 6 in a clockwise direction.

Since the belt driving roller 6 is disposed on the downstream side of the paper conveying direction, the paper feeding side of the conveyor belt 5 (the upper side in FIG. 1) is pulled by the belt driving roller 6. Thus, the belt can be stretched without slack, and stable conveyance of the recording paper P becomes possible. A sheet made of a dielectric resin is used for the conveyor belt 5, and a belt without seams (seamless belt) or the like is preferably used as the conveyor belt 5.

Furthermore, an ejection roller 8a and a driven roller 8b are provided on the downstream side of the transporting belt 5 in the sheet-transporting direction. The ejection roller 8a is driven in a clockwise direction in the drawing to eject the recording paper P, on which an image has been recorded, to the outside of the main body of the apparatus. The driven roller 8b pressure-contacts with the upper part of the ejection roller 8a and is rotated by the ejection roller 8a. A paper ejection tray 10, on which the recording papers P that has been ejected to the outside of the main body of the apparatus are stacked, is disposed on the downstream side of the ejection roller 8a and driven roller 8b.

Since the driven roller 8b directly contacts with the printed surface of the recording paper P, the material that forms the surface of the driven roller 8b is preferably a water repelling material. By forming the surface of the driven roller 8b by using the water repelling material, the adhesion of the ink, that has not penetrated into the recording paper P, to the driven roller 8b can be suppressed, which makes suppression of the occurrence of offset easy. Examples of preferable water repelling materials may include fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride. Similarly to the driven roller 8b, it is preferable that the surfaces of elements to be contacted with the printed surface of the recording paper P are formed by a water repelling material.

Furthermore, line heads 11C, 11M, 11Y and 11K that are configured to record an image on the recording paper P conveyed on the conveyor belt 5 are disposed on the upper side of the conveyor belt 5. The line heads 11C, 11M, 11Y and 11K are supported at such a height that a predetermined interval is formed against the upper surface of the conveyor belt 5. The line heads 11C, 11M, 11Y and 11K are filled with colored inks having respective different four colors (cyan, magenta, yellow and black). A color image is formed on the recording paper P by ejecting the respective colored inks from the respective line heads 11C to 11K.

It is preferable for the miniaturization of the apparatus that the time from the landing of the droplets of the inks ejected from the respective line heads 11C to 11K on the recording paper P to the arrival of the portion on which the inks have landed on the recording paper P at an ejection part 8 including the ejection roller 8a and the driven roller 8b, which is configured to eject the recording paper P, is within 1 second. Even in the case when such time is adjusted to within 1 second, a sufficient effect of suppressing the occurrence of offset during image formation at a high-speed can be obtained by using the ink of the first exemplary embodiment.

Furthermore, the amount(s) of the ink(s) of a single color or plural colors which is/are ejected from the respective line heads 11C to 11K toward the recording paper P and typed on the recording paper P is/are not specifically limited. An image is formed by ink droplets that have been adjusted to have an amount by which the image can be formed at a desired image density and offset is difficult to occur.

As shown in FIG. 2, these line heads 11C to 11K include nozzle arrays each including plural nozzles arranged in the direction orthogonal to the convey direction (the vertical direction in FIG. 2) and has a recording area having a width equal to or more than the width of the recording paper P as conveyed, which enables recording of an image for one line all at once on the recording paper P being conveyed on the conveyor belt 5.

Although the inkjet recording apparatus of a line head-type recording system uses a line head that is configured to have a recording area having a width equal to or more than the width of the recording paper P by arranging the plural nozzles in the longitudinal direction of the main body of a long head formed to have width and size equal to or more than those of the conveyor belt 5, for example, a line head that has been made possible to record an image over the whole width in the width direction of the recording paper P being conveyed, by arranging plural short head units each including plural nozzles in the width direction of the conveyor belt 5 may also be used.

Furthermore, as the system for ejecting the inks from the line heads 11C to 11K, various systems such as a piezoelectric element system in which droplets of inks are ejected by utilizing pressures generated in the liquid chambers of the line heads 11C to 11K by using piezoelectric elements (piezo elements) that are not depicted, and a thermal inkjet system in which inks are ejected by applying a pressure by generating air bubbles by a heat generator can be applied. The system for ejecting the inks is preferably a piezoelectric element system since ejection amounts can be controlled easily.

Figure 3:
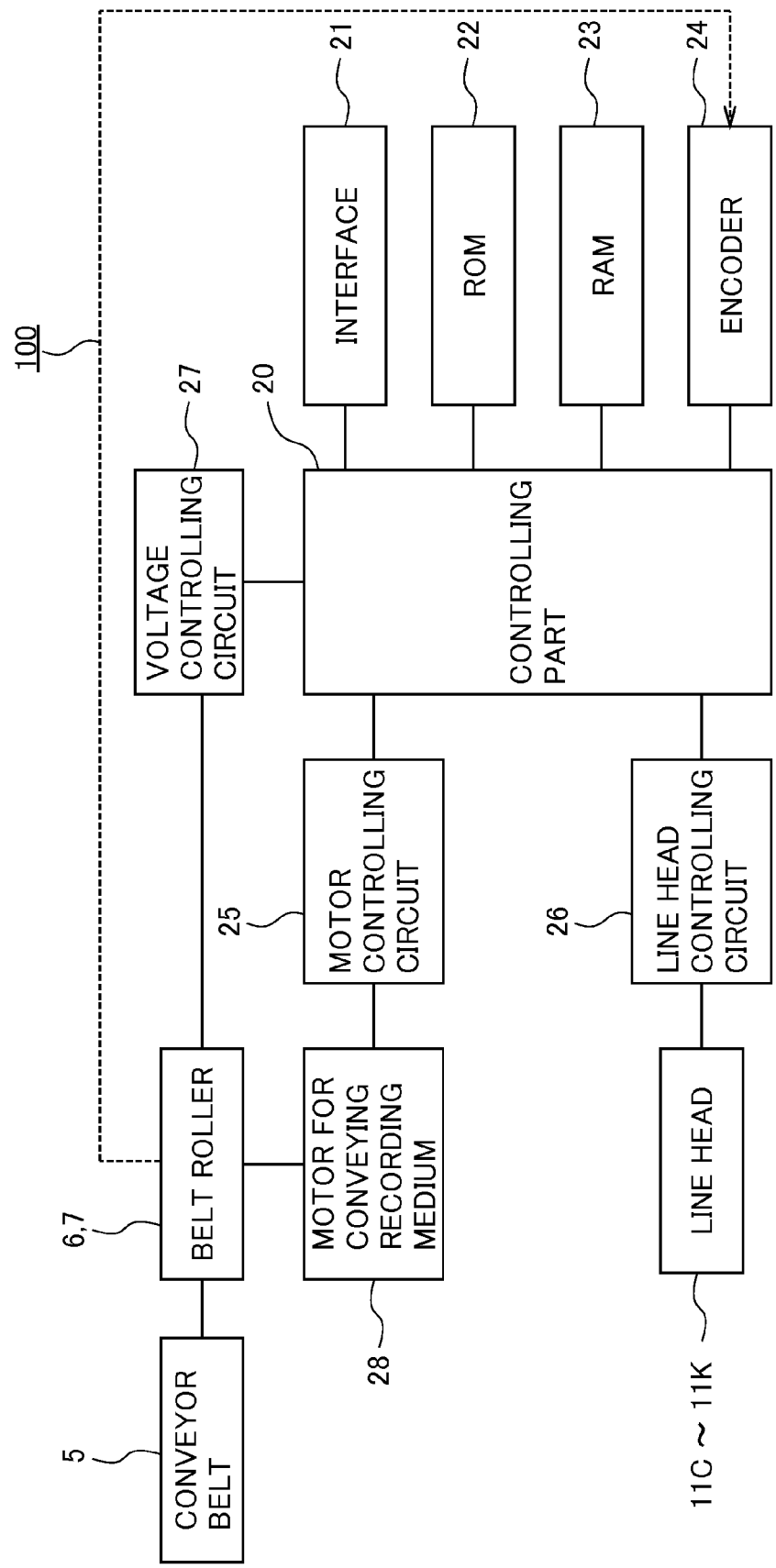
FIG. 3 is a block diagram showing the structure of an inkjet recording apparatus including a line head-type recording system.

FIG. 3 is a block diagram showing the structure of the inkjet recording apparatus of a line head-type recording system. Identical symbols are provided to the parts common with those of FIG. 1 and FIG. 2, and the explanations thereon are not repeated. The inkjet recording apparatus 100 includes a controlling part 20. An interface 21, a ROM 22, a RAM 23, an encoder 24, a motor controlling circuit 25, a line head controlling circuit 26 and a voltage controlling circuit 27, and the like are connected to the controlling part 20.

The interface 21 sends data to, for example, a host apparatus that is not depicted such as a personal computer, or receives data therefrom. The controlling part 20 converts an image signal that has been received via the interface 21 to image data, by subjecting the image signal to a magnification-changing processing or a gradation processing as necessary. The controlling part 20 then outputs controlling signals to various controlling circuits mentioned below.

The ROM 22 stores a controlling program and the like when an image is recorded by driving line heads 11C to 11K. The RAM 23 stores the image data that has undergone the magnification-changing processing or gradation processing by the controlling part 20 in a predetermined area.

The encoder 24 is connected to the belt driving roller 6 at the paper ejection side which drives the conveyor belt 5, and outputs a pulse array depending on the amount of the rotation-displacement amount of the rotation axis of the belt driving roller 6. The controlling part 20 calculates the amount of rotation by counting the number of pulses sent by the encoder 24 to figure out the feeding amount of the paper (the paper position). Furthermore, the controlling part 20 outputs controlling signals to the motor controlling circuit 25 and the line head controlling circuit 26 based on signals from the encoder 24.

The motor controlling circuit 25 drives a motor 28 for conveying the recording medium based on the signal output from the controlling part 20. The motor 28 for conveying the recording medium is driven to rotate the belt driving roller 6 and rotate the conveyor belt 5 in a clockwise direction in FIG. 1 to convey the paper in the direction of the arrow X.

The line head controlling circuit 26 transfers the image data stored in the RAM 23 to the line heads 11C to 11K based on the signal output from the controlling part 20 and controls the ejection of the inks from the line heads 11C to 11K based on the transferred image data. The process for recording on the paper is conducted by such control, and the control of the conveyance of the recording paper P by the conveyor belt 5 that is driven by the motor 28 for conveying the recording medium.

A voltage controlling circuit 27 causes an alternating electric field by applying a voltage to the belt roller 7 at the paper feeding side based on the signal output from the controlling part 20, thereby the recording paper P is statically attracted by the conveyor belt 5. The static attraction is deactivated by grounding the belt roller 7 or belt driving roller 6 based on the signal output by the controlling part 20. Although a structure in which a voltage is applied to the belt roller 7 at the paper feeding side is shown here, a structure in which a voltage is applied to the belt driving roller 6 at the paper ejection side may also be used.

Figure 4:
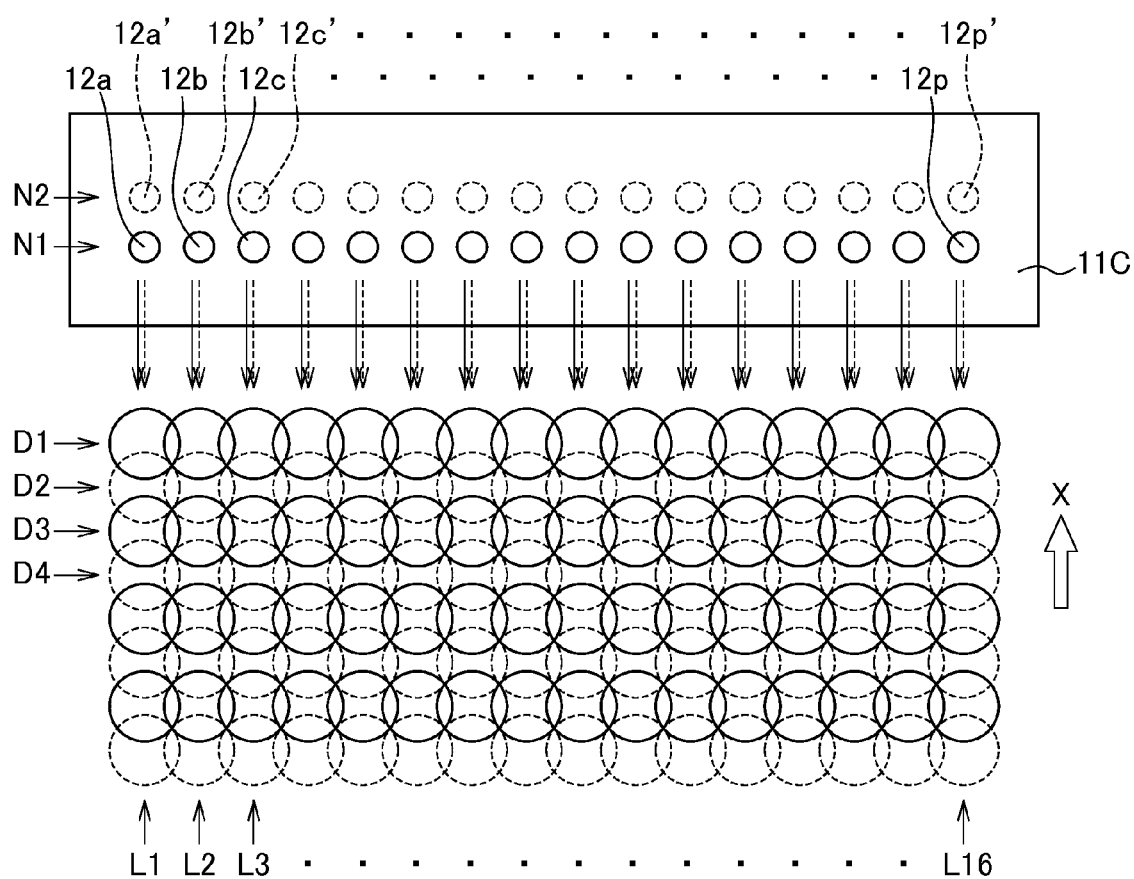
FIG. 4 is a plane view showing a line head that is used for an inkjet recording apparatus including a line head-type recording system, and a part of dot arrays formed on a recording paper.

A method for forming dots by using an inkjet recording apparatus of line head-type recording system will be specifically explained by using FIG. 4. Among the line heads 11C to 11K shown in FIG. 1 and FIG. 2, the line head 11C is explained as an example in FIG. 4, but the same explanation also applies to the other line heads 11M to 11K.

As shown in FIG. 4, nozzle arrays N1 and N2 each including plural nozzles are disposed in parallel in the convey direction of the recording paper P (the direction of the arrow X) in the line head 11C. Namely, the nozzle arrays N1 and N2 each has one nozzle, i.e., the nozzle arrays have two nozzles in total (for example, a dot array L1 has nozzles 12a and 12a'), as nozzles for forming respective dot arrays in the convey direction of the recording paper P. For the convenience of the explanation, only respective 16 nozzles for 12a to 12p and 12a' to 12p' that correspond to the dot arrays L1 to L16 are described among the nozzles that constitute the nozzle arrays N1 and N2, but a larger number of nozzles are actually arranged in the direction orthogonal to the convey direction of the recording paper P.

Furthermore, using the nozzle arrays N1 and N2 sequentially, an image is formed on the recording paper P as a recording medium. For example, a dot array D1 corresponding to one line in the width direction (the horizontal direction in the drawing) of the recording paper P is formed by the ejection of the ink from the nozzle array N1 (the solid arrows in the drawing), thereafter a dot array D2 corresponding to the next one line is formed by the ejection of the ink from the nozzle array N2 (the dashed arrows in the drawing), and a dot array D3 corresponding to the next one line is formed by the ejection of the ink from the nozzle array N1 again, while the recording paper P is conveyed to the convey direction of the recording paper P. A dot array D4 and the following dot arrays are formed similarly by using the nozzle arrays N1 and N2 in an alternate manner.

According to the image forming method according to the second exemplary embodiment explained above, image turbulence can be suppressed in the case when an image is formed after ejection of the ink from a recording head has been stopped for a while, and the state of ejection of the ink droplets from the recording head can be readily recovered to a fine state even in the case when the recording head in which the ink is filled has been left for a long period, thereby suppression of the occurrence of offset and formation of an image having a desired image density can be balanced. Therefore, the image forming method according to the second exemplary embodiment can be preferably utilized in various inkjet recording apparatuses.

EXAMPLES

Hereinafter the present disclosure will further be specifically explained by Examples. However, the present disclosure is not construed at all to be limited by Examples.

Reference Example 1

A stirrer, a nitrogen introduction tube, a condenser and a dropping funnel were attached to a four-necked flask having a volume of 1,000 ml, and 100 g of isopropyl alcohol and 300 g of methyl ethyl ketone were added to the flask. Next, heating was conducted under nitrogen bubbling until the reflux of the solvent in the flask was initiated. A solution containing 30 g of methyl methacrylate, 80 g of styrene, 42 g of butyl acrylate and 48 g of methacrylic acid (MAA), and 0.3 g of an initiator (azobisisobutyronitrile (AIBN)) was added to the dropping funnel, and the monomers and initiator were added dropwise over 2 hours in the state that the four-necked flask is refluxed by heating to 70° C. After the dropwise addition was completed, reflux under heating was further conducted for 6 hours. After the reflux for 6 hours, methyl ethyl ketone containing 0.1 g of AIBN was added dropwise over 15 minutes. After the dropwise addition was completed, reflux under heating was further conducted for 6 hours to give a styrene-acrylic resin having a weight average molecular weight of 53,000. Furthermore, the acid value of the obtained styrene-acrylic resin was measured and found to be 160 mgKOH/g.

Reference Example 2

Preparation of Pigment Dispersion 7.5% by mass of a styrene-acrylic resin, 25% by mass of a cyan pigment (P.B-15:3), 0.5% by mass of 2-ethyl-1,3-hexanediol and a balance amount of ion-exchanged water were charged in a Dyno Mill (manufactured by Shinmaru Enterprises Corporation), zirconia beads each having a diameter of 0.5 mm were charged in the vessel of the Dyno Mill, and a dispersion treatment was conducted to give a cyan pigment dispersion. The zirconia beads were filled in the vessel at a filling rate of 60% with respect to the vessel volume. The Dyno Mill used in Reference Example 2 had a vessel volume of 1.4 L. The obtained pigment dispersion was diluted to 300-fold with ion-exchanged water, and the volume average particle size D50 of the pigment was measured by a dynamic light scattering particle size distribution measurement apparatus (Zetasizer Nano, manufactured by Sysmex Corporation) to confirm that the volume average particle size of the pigment was within the range of 70 to 130 nm.

Examples 1 to 10, and Comparative Examples 1 to 7

The inks of Examples 1 to 10 and Comparative Examples 1 to 7 were each obtained by homogeneously mixing the pigment dispersion prepared in Reference Example 2, a high penetrating agent, a penetrating agent, a dissolution stabilizer (2-pyrrolidone), glycerin, 1,3-propanediol (PDO) and ion-exchanged water in the amounts described in Table 1 and Table 2 by stirring with a stirrer (a three-one motor BL-600 (manufactured by As One Corporation)) at a rotation number of 400 rpm, and filtering the mixture by a filter having a pore diameter of 5 μm.

As the high penetrating agent, 2-ethyl-1,3-hexanediol that is the alkyl-substituted 1,3-hexanediol having 8 carbon atoms was used. Furthermore, as the penetrating agent, monoalkyl ethers or dialkyl ether of the polyhydric alcohols of the following A to E were used.

Penetrating Agent
A: Diethylene glycol monomethyl ether
B: Triethylene glycol monobutyl ether
C: Diethylene glycol monohexyl ether
D: Diethylene glycol mono-2-ethylhexyl ether
E: Diethylene glycol dibutyl ether Furthermore, according to the following methods, the offset, intermittent ejection performance and image density of Examples 1 to 10 and Comparative Examples 1 to 7 were evaluated. The result of the evaluation of the offset, intermittent ejection performance and image density of the inks of Examples 1 to 10 and Comparative Examples 1 to 7 are shown in Table 1, Table 2 and Table 3.

Method for Evaluation of Offset

An ink was filled in the recording head that was disposed on the position closest to the ejection roller (this corresponds to 11K in FIG. 1), and the excess liquid overflowing from the nozzle-forming surface was scraped off by a wiping blade. The distance between the nozzle surface of the recording head and the recording paper P was fixed to 1 mm, and the convey velocity of the recording paper P from the paper feeding part to the ejection part was set to 846.7 mm/sec. As the recording paper P, a paper (IJW (manufactured by Oji Paper Co., Ltd.)) cut into an A4 size was used, and ten solid images of 10 cm×10 cm each were printed continuously by ejecting the ink from the recording head so that the ejection amount of the ink on the recording paper P became 15 g/m². For the tenth recording paper P on which the image had been printed, the contamination of the recording paper P by offset was evaluated according to the following method.

First, the image offset part (the part on which paper contamination occurs by the ink adhered to the roller) of the recording paper P on which the image had been formed was put on an image scanner (GT-X820 (manufactured by Seiko Epson Corporation)), and binarization was conducted at a threshold value of 220. An offset area rate that is an index for occurrence of offset was calculated from the number of the black pixels and the number of the all pixels in the binarized image, based on the following equation. The higher the offset surface area rate is, the stronger the degree of pollution of the recording paper P by offset is. When the offset area rate exceeds 0.030, the pollution of the recording paper P by offset can be confirmed by a visual observation. Therefore, the case when the offset area rate exceeded 0.030 was judged as NG, and the case when the offset area rate was 0.030 or less was judged as OK.

(Equation for Calculation of Offset Area Rate)

$$\text{Offset area rate}(\%) = 100 \times \text{Number of black pixels} / \text{Number of all pixels}$$

Method for Evaluating Intermittent Ejection Performance

In a recording head including a heater which can keep the temperature of inside of the recording head and a temperature detection function inside of the head, the temperature for heat retention was set to 25° C., and the intermittent ejection performance under an environment of 10° C. and 15% RH was evaluated. Specifically, a line image in the longitudinal direction of the head was printed, thereafter the head underwent an optional non-printed interval of 21 mm or more, a line image in the longitudinal direction of the head was printed again, and the printing states of the line images were observed by a microscope to evaluate the intermittent ejection performance. The intermittent ejection performance was quantified by considering the case when line images are formed at a non-printing interval (420 mm) that corresponds to a portrait A3 length and no turbulence of the line images occurs as 100%. For example, in the case when there is no turbulence on the line image that is at a non-printing interval of 420 mm from the previously-formed line image but turbulence occurs on the line image that is at a non-printing interval of 441 mm, the value of the intermittent ejection performance is 100%. And in the case when there is no turbulence on the line image that is at a non-printing interval of 336 mm but turbulence occurs on the line image that is at a non-printing interval of 357 mm, the value of the intermittent ejection performance is 80%. The case when the intermittent ejection performance was 100% or more was judged as OK, and the case when the intermittent ejection performance was lower than 100% was judged as NG.

Method for Evaluation of Image Density

Using a plain paper (A4, PPC paper) as a recording medium, a solid image of 10 cm×10 cm was printed by setting the amount of the ink ejected from one nozzle to 11 pL. The plain paper on which the image had been formed was stored under an environment at an ordinary temperature and an ordinary humidity for a day and a night, and the image density of the image part was measured by a portable reflection density meter RD-19 (manufactured by Gretag Macbeth), and the average value of the image density of the ten points in the solid image was considered as a image density. A image density of 1.0 or more was judged as OK, and a image density of lower than 1.0 was judged as NG.

TABLE 1

| Composition of ink | Comparative Example 1 | Example 1 | Example 2 | Comparative Example 2 | Example 3 | Comparative Example 3 |
|---|---|---|---|---|---|---|
| Pigment dispersion (% by mass) | 24.0 | 24.0 | 24.0 | 24.0 | 24.0 | 24.0 |
| High penetrating agent (% by mass) | 1.0 | 1.0 | 1.0 | 1.0 | 1.0 | 1.0 |
| Penetrating agent (kind/% by mass) | A/0.5 | A/1.0 | A/3.0 | A/5.0 | B/3.0 | C/0.5 |
| Solution stabilizer (% by mass) | 5.0 | 5.0 | 5.0 | 5.0 | 5.0 | 5.0 |
| Glycerin (% by mass) | 15.0 | 15.0 | 15.0 | 15.0 | 15.0 | 15.0 |
| PDO (% by mass) | 20.0 | 20.0 | 20.0 | 20.0 | 20.0 | 20.0 |
| Ion exchanged water (% by mass) | 34.5 | 34.0 | 32.0 | 30.0 | 32.0 | 34.5 |
| Offset (area rate/judgment) | 0.025/ OK | 0.022/ OK | 0.018/ OK | 0.010/ OK | 0.017/ OK | 0.033/ NG |
| Intermittent ejection performance (evaluation/judgment) | 120/ OK | 120/ OK | 120/ OK | 120/ OK | 120/ OK | 125/ OK |
| Image density (density/judgment) | 0.98/ NG | 1.11/ OK | 1.10/ OK | 0.95/ NG | 1.20/ OK | 0.95/ NG |

TABLE 2

| | Composition of ink | | | | |
|---|---|---|---|---|---|
| | Example 4 | Example 5 | Comparative Example 4 | Example 6 | Example 7 |
| Pigment dispersion (% by mass) | 24.0 | 24.0 | 24.0 | 24.0 | 24.0 |
| High penetrating agent (% by mass) | 1.0 | 1.0 | 1.0 | 1.0 | 1.0 |
| Penetrating agent (kind/% by mass) | C/1.0 | C/1.5 | C/2.0 | D/1.0 | E/1.0 |
| Solution stabilizer (% by mass) | 5.0 | 5.0 | 5.0 | 5.0 | 5.0 |
| Glycerin (% by mass) | 15.0 | 15.0 | 15.0 | 15.0 | 15.0 |
| PDO (% by mass) | 20.0 | 20.0 | 20.0 | 20.0 | 20.0 |
| Ion exchanged water (% by mass) | 34.0 | 33.5 | 33.0 | 34.0 | 34.0 |
| Offset (area rate/judgment) | 0.024/ OK | 0.017/ OK | 0.012/ OK | 0.022/ OK | 0.021/ OK |
| Intermittent ejection performance (evaluation/judgment) | 120/ OK | 120/ OK | 115/ OK | 120/ OK | 120/ OK |
| Image density (density/judgment) | 1.06/ OK | 1.05/ OK | 0.97/ NG | 1.03/ OK | 1.05/ OK |

TABLE 3

| Composition of ink | Comparative Example 5 | Example 8 | Example 9 | Comparative Example 6 | Example 10 | Comparative Example 7 |
|---|---|---|---|---|---|---|
| Pigment dispersion (% by mass) | 24.0 | 24.0 | 24.0 | 24.0 | 24.0 | 24.0 |
| High penetrating agent (% by mass) | 1.0 | 1.0 | 1.0 | 1.0 | 1.0 | 1.0 |
| Penetrating agent (kind/% by mass) | D/0.3 | D/0.5 | D/1.5 | D/1.8 | E/0.5 | E/1.8 |
| Solution stabilizer (% by mass) | 5.0 | 5.0 | 5.0 | 5.0 | 5.0 | 5.0 |
| Glycerin (% by mass) | 15.0 | 15.0 | 15.0 | 15.0 | 15.0 | 15.0 |
| PDO (% by mass) | 20.0 | 20.0 | 20.0 | 20.0 | 20.0 | 20.0 |
| Ion exchanged water (% by mass) | 34.7 | 34.5 | 33.5 | 33.2 | 33.5 | 33.2 |
| Offset (area rate/judgment) | 0.035/ NG | 0.028/ OK | 0.018/ OK | 0.015/ OK | 0.027/ OK | 0.027/ OK |
| Intermittent ejection performance (evaluation/judgment) | 125/ OK | 120/ OK | 115/ OK | 120/ OK | 120/ OK | 120/ OK |
| Image density (density/judgment) | 1.01/ OK | 1.05/ OK | 1.02/ OK | 0.98/ NG | 1.03/ OK | 0.96/ NG |

According to Table 1, it is understood from the comparison of Examples 1 to 3 with Comparative Examples 1 and 2 that the image turbulence in the case when an image is formed after the ejection of the ink from the recording head has been stopped for a while and the pollution of the recording medium due to offset can be suppressed, and thus an image having a desired image density can be formed, when the inks, in which the total amount of the contents of the high penetrating agent and penetrating agent is 2 to 4% by mass in the inks each including specific amounts of the glycerin and 1,3-propanediol, 0.5 to 2.5% by mass of a high penetrating agent, and a C1-C4 alkyl ether of a polyhydric alcohol as the penetrating agent, were used.

Furthermore, according to Table 1, Table 2 and Table 3, it is understood from the comparison of Examples 4 to 10 with Comparative Examples 3 to 7 that the image turbulence in the case when an image is formed after the ejection of the ink from the recording head has been stopped for a while and the pollution of the recording medium due to offset can be suppressed, and thus an image having a desired image density can be formed, in the cases when the inks, in which the total amount of the contents of the high penetrating agent and penetrating agent is 1.5 to 2.5% by mass in the inks each including specific amounts of the glycerin and 1,3-propanediol, 0.5 to 2.5% by mass of a high penetrating agent, and a C6-C7 monoalkyl ether of a polyhydric alcohol or a dibutyl ether of a polyhydric alcohol as the penetrating agent, were used.

Examples 11 to 14 and Comparative Examples 8 to 12

The inks of Examples 11 to 14 and Comparative Examples 8 to 12 were each obtained by homogeneously mixing the pigment dispersion prepared in Reference Example 2, a high penetrating agent, a penetrating agent, a dissolution stabilizer (2-pyrrolidone), glycerin, 1,3-propanediol (PDO) and ion-exchanged water in the amounts described in Table 4 and Table 5 by stirring with a stirrer (a three-one motor BL-600 (manufactured by As One Corporation)) at a rotation number of 400 rpm, and filtering the mixture by a filter having a pore diameter of 5 μm. The "PG" described in Table 4 and Table 5 means propylene glycol.

As the high penetrating agent, 2-ethyl-1,3-hexanediol that is an alkyl-substituted 1,3-hexanediol having 8 carbon atoms was used. Furthermore, as the penetrating agent, triethylene glycol monobutyl ether that is a C1-C4 monoalkyl ether of a polyhydric alcohol was used.

The results of the evaluation of the offset, intermittent ejection performance, image density and recovering performance of the obtained inks of Examples 11 to 14 and Comparative Examples 8 to 12 are shown in Table 4 and Table 5. The recovering performance of the ink was evaluated according to the following method.

Method for Evaluating Recovering Performance

The ink was filled in the recording head, purging and wiping in set were conducted three times, and the recording head was left without being capped for one month. The purge amount was 2 cc per a time. After leaving for one month, purging and wiping in set were conducted three times, and a check pattern by which the ejection states of the all nozzles of the recording head can be confirmed was printed. The case when ejection could be confirmed for the all nozzles was judged as OK, and the case when an unejected nozzle was confirmed was judged as NG.

TABLE 4

| | Composition of ink | | | | |
|---|---|---|---|---|---|
| | Comparative Example 8 | Example 11 | Example 12 | Comparative Example 9 | Comparative Example 10 |
| Pigment dispersion (% by mass) | 24.0 | 24.0 | 24.0 | 24.0 | 24.0 |
| High penetrating agent (% by mass) | 1.0 | 1.0 | 1.0 | 1.0 | 1.0 |
| Penetrating agent (% by mass) | 3.0 | 3.0 | 3.0 | 3.0 | 3.0 |
| Solution stabilizer (% by mass) | 5.0 | 5.0 | 5.0 | 5.0 | 5.0 |
| Glycerin (% by mass) | 30.0 | 25.0 | 15.0 | 25.0 | 15.0 |
| PDO (% by mass) | — | 10.0 | 20.0 | — | — |
| PG (% by mass) | — | — | — | 10.0 | 20.0 |
| Ion exchanged water (% by mass) | 37.0 | 32.0 | 32.0 | 32.0 | 32.0 |
| Offset (area rate/judgment) | 0.050/ NG | 0.030/ OK | 0.020/ OK | 0.025/ OK | 0.015/ OK |
| Intermittent ejection performance (evaluation/judgment) | 60/ NG | 110/ OK | 120/ OK | 90/ NG | 100/ OK |
| Image density (density/judgment) | 1.12/ OK | 1.11/ OK | 1.10/ OK | 1.10/ OK | 1.10/ OK |
| Recovering performance (judgment) | OK | OK | OK | OK | NG |

TABLE 5

| | Composition of ink | | | |
|---|---|---|---|---|
| | Comparative Example 11 | Example 13 | Example 14 | Comparative Example 12 |
| Pigment dispersion (% by mass) | 24.0 | 24.0 | 24.0 | 24.0 |
| High penetrating agent (% by mass) | 1.0 | 1.0 | 1.0 | 1.0 |
| Penetrating agent (% by mass) | 3.0 | 3.0 | 3.0 | 3.0 |
| Solution stabilizer (% by mass) | 5.0 | 5.0 | 5.0 | 5.0 |
| Glycerin (% by mass) | 30.0 | 10.0 | 5.0 | — |
| PDO (% by mass) | 5.0 | 25.0 | 30.0 | 35.0 |
| PG (% by mass) | — | — | — | — |
| Ion exchanged water (% by mass) | 32.0 | 32.0 | 32.0 | 32.0 |
| Offset (area rate/judgment) | 0.040/ NG | 0.017/ OK | 0.015/ OK | 0.010/ OK |
| Intermittent ejection performance (evaluation/judgment) | 90/ NG | 115/ OK | 120/ OK | 125/ OK |
| Image density (density/judgment) | 1.10/ OK | 1.12/ OK | 1.11/ OK | 1.12/ OK |
| Recovering performance (judgment) | OK | OK | OK | NG |

According to Table 4 and Table 5, it is understood that the image turbulence in the case when an image is formed after the ejection of the ink from the recording head has been stopped for a while and the pollution of the recording medium due to offset can be suppressed easily, and thus an image having a desired image density can be formed easily by using the inks of Examples 11 to 14 in which the content of the 1,3-propanediol (PDO) is 10 to 30% by mass and the content of the glycerin is 5% by mass or more. Furthermore, by using the inks of Examples 11 to 14, even if the recording head has been left for a long period such as one month, the ejection state of the recording head can be recovered to the state before the leaving by recovering operations in which purging and wiping are conducted.

Example 15, Example 16 and Comparative Examples 13 to 19

The inks of Example 15, Example 16 and Comparative Examples 13 to 19 were each obtained by homogeneously mixing the pigment dispersion prepared in Reference Example 2, a high penetrating agent, a penetrating agent, a dissolution stabilizer (2-pyrrolidone), glycerin, 1,3-propanediol and ion-exchanged water in the amounts described in Table 7 and Table 8 by stirring with a stirrer (a three-one motor BL-600 (manufactured by As One Corporation)) at a rotation number of 400 rpm, and filtering the mixture by a filter having a pore diameter of 5 μm.

As the high penetrating agent, the polyvalent alkanediols of a to f described in Table 6 were each used. Furthermore, as the penetrating agent, triethylene glycol monobutyl ether that is a C1-C4 monoalkyl ether of a polyhydric alcohol was used.

The results of the evaluation of the dynamic surface tensions, offset, intermittent ejection performance, image density and recovering performance of the obtained inks of Example 15, Example 16 and Comparative Examples 13 to 19 are shown in Table 7 and Table 8. The dynamic surface tension was measured according to the following method.

Method for Measuring Dynamic Surface Tension

Using a bubble pressure dynamic surface tension meter (BP-100 (manufactured by Sanyo Trading Co., Ltd.)), the surface tension values at lifetimes of from 10 to 1,000 msec were measured, and the surface tension value at the surface lifetime of 10 msec was considered as the dynamic surface tension of the ink.

TABLE 6

| | Chemical formula/ number of carbon atoms | Structure | Note |
|---|---|---|---|
| a | 1,2-Heptanediol/C7 | Straight Chain | Liquid at room temperature. |
| b | 1,2-Octanediol/C8 | Straight Chain | Solid at room temperature. Melting point 30° C. 0.9% by mass is dissolved in water at room temperature. |
| c | 2-Ethyl-1,3-hexanediol/C8 | Branched Chain | Liquid at room temperature. |
| d | 2,2,4-Trimethyl-1,3-pentanediol/C8 | Branched Chain | Solid at room temperature. Melting point 50° C. 1.5% by mass is dissolved in water at room temperature. |
| e | 2-Butyl-2-ethyl-1,3-propanediol/C9 | Branched Chain | Solid at room temperature. Melting point 45° C. 1.0% by mass is dissolved in water at room temperature. |
| f | 2-Butyl-2-methyl-1,3-propanediol/C8 | Branched Chain | Liquid at room temperature. |

TABLE 7

| | Composition of ink | | | | |
|---|---|---|---|---|---|
| | Comparative Example 13 | Comparative Example 14 | Comparative Example 15 | Comparative Example 16 | Example 15 |
| Pigment dispersion (% by mass) | 24.0 | 24.0 | 24.0 | 24.0 | 24.0 |
| High penetrating agent (kind/% by mass) | — | a/1.0 | a/2.0 | b/1.0 | c/1.0 |
| Penetrating agent (% by mass) | 3.0 | 3.0 | 3.0 | 3.0 | 3.0 |
| Solution stabilizer (% by mass) | 5.0 | 5.0 | 5.0 | 5.0 | 5.0 |
| Glycerin (% by mass) | 15.0 | 15.0 | 15.0 | 15.0 | 15.0 |
| PDO (% by mass) | 20.0 | 20.0 | 20.0 | 20.0 | 20.0 |
| Ion exchanged water (% by mass) | 33.0 | 32.0 | 31.0 | 32.0 | 32.0 |
| Dynamic surface tension (mN/m) | 55 | 53 | 50 | 44 | 47 |
| Offset (area rate/judgment) | 0.230/ NG | 0.060/ NG | 0.040/ NG | 0.018/ OK | 0.020/ OK |
| Intermittent ejection performance (evaluation/judgment) | 130/ OK | 125/ OK | 115/ OK | 115/ OK | 120/ OK |
| Image density (density/judgment) | 0.88/ NG | 1.08/ OK | 1.00/ OK | 1.10/ OK | 1.13/ OK |
| Recovering performance (judgment) | OK | OK | OK | NG | OK |

TABLE 8

| | Composition of ink | | | |
|---|---|---|---|---|
| | Example 16 | Comparative Example 17 | Comparative Example 18 | Comparative Example 19 |
| Pigment dispersion (% by mass) | 24.0 | 24.0 | 24.0 | 24.0 |
| High penetrating agent (kind/% by mass) | c/2.0 | e/1.0 | f/2.0 | f/2.5 |
| Penetrating agent (% by mass) | 3.0 | 3.0 | 3.0 | 3.0 |

TABLE 8-continued

|  | Composition of ink | | | |
|---|---|---|---|---|
|  | Example 16 | Comparative Example 17 | Comparative Example 18 | Comparative Example 19 |
| Solution stabilizer (% by mass) | 5.0 | 5.0 | 5.0 | 5.0 |
| Glycerin (% by mass) | 15.0 | 15.0 | 15.0 | 15.0 |
| PDO (% by mass) | 20.0 | 20.0 | 20.0 | 20.0 |
| Ion exchanged water (% by mass) | 33.0 | 32.0 | 31.0 | 32.0 |
| Dynamic surface tension (mN/m) | 45 | 45 | 58 | 55 |
| Offset (area rate/judgment) | 0.015/ OK | 0.018/ OK | 0.330/ NG | 0.280/ NG |
| Intermittent ejection performance (evaluation/judgment) | 115/ OK | 105/ OK | 125/ OK | 115/ OK |
| Image density (density/judgment) | 1.08/ OK | 1.03/ OK | 1.02/ OK | 0.98/ NG |
| Recovering performance (judgment) | OK | NG | OK | OK |

According to Table 7 and Table 8, it is understood that the dynamic surface tension increases and thus the pollution of the recording medium by offset readily occurs by using the ink of any one of Comparative Examples 13 to 15, Comparative Example 18 and Comparative Example 19 which contain the penetrating agent a or penetrating agent f as the high penetrating agent, or is free from the high penetrating agent. Furthermore, an image having a desired density could not be formed by the ink of Comparative Example 13 that was free from the high penetrating agent. In addition, the pollution of the recording medium due to offset is difficult to occur by using the ink of Comparative Example 16 or Comparative Example 17 that use the penetrating agents b and e, respectively, as the high penetrating agent. However, since the inks of Comparative Example 16 and Comparative Example 17 had low solubility in water and contained a high penetrating agent that is solid at a room temperature, in the case, by using the ink of Comparative Example 16 or Comparative Example 17, when the recording head has been left for a long period, the high penetrating agent was easily solidified in the ink, and thus the ejection state of the ink could not be recovered to the state before the leaving by recovering operations in which purging and wiping are conducted.

On the other hand, since the inks of Example 15 and Example 16 that contained 2-ethyl-1,3-hexanediol that is an alkyl-substituted 1,3-hexanediol having 8 carbon atoms as the high penetrating agent had a low dynamic surface tension, by using the ink of Example 15 or Example 16, the pollution of the recording medium due to offset was difficult to occur; and since the inks contained the high penetrating agent that is liquid at a room temperature, by using the ink of Example 15 or Example 16, even when the recording head had been left for a long period, the ejection state of the ink could be recovered to the state before the leaving by recovering operations in which purging and wiping are conducted.

Examples 17 to 23 and Comparative Examples 20 to 24

The inks of Examples 17 to 23 and Comparative Examples 20 to 24 were each obtained by homogeneously mixing the pigment dispersion prepared in Reference Example 2, a high penetrating agent, a penetrating agent, a dissolution stabilizer (2-pyrrolidone), glycerin, 1,3-propanediol and ion-exchanged water in the amounts described in Table 9 and Table 10 by stirring with a stirrer (a three-one motor BL-600 (manufactured by As One Corporation)) at a rotation number of 400 rpm, and filtering the mixture by a filter having a pore diameter of 5 μm.

As the high penetrating agent, the penetrating agents c and d described in Table 5, which are each an alkyl-substituted 1,3-hexanediol or alkyl-substituted 1,3-pentanediol having 8 carbon atoms, were used. Furthermore, triethylene glycol monobutyl ether that is a C1-C4 monoalkyl ether of a polyhydric alcohol was used as the penetrating agent.

The results of the evaluation of the offset, intermittent ejection performance, image density and recovering performance of the obtained inks of Examples 17 to 23 and Comparative Examples 20 to 24 are shown in Table 9 and Table 10.

TABLE 9

|  | Composition of ink | | | | |
|---|---|---|---|---|---|
|  | Comparative Example 20 | Example 17 | Example 18 | Example 19 | Comparative Example 21 |
| Pigment dispersion (% by mass) | 24.0 | 24.0 | 24.0 | 24.0 | 24.0 |
| High penetrating agent (kind/% by mass) | c/0.3 | c/0.5 | c/1.0 | c/2.5 | c/3.0 |
| Penetrating agent (% by mass) | 3.0 | 3.0 | 3.0 | 3.0 | 3.0 |
| Solution stabilizer (% by mass) | 5.0 | 5.0 | 5.0 | 5.0 | 5.0 |

TABLE 9-continued

| | Composition of ink | | | | |
|---|---|---|---|---|---|
| | Comparative Example 20 | Example 17 | Example 18 | Example 19 | Comparative Example 21 |
| Glycerin (% by mass) | 15.0 | 15.0 | 15.0 | 15.0 | 15.0 |
| PDO (% by mass) | 20.0 | 20.0 | 20.0 | 20.0 | 20.0 |
| Ion exchanged water (% by mass) | 32.7 | 32.5 | 32.0 | 30.5 | 30.0 |
| Offset (area rate/judgment) | 0.035/ NG | 0.030/ OK | 0.020/ OK | 0.013 OK | 0.012/ OK |
| Intermittent ejection performance (evaluation/judgment) | 120/ OK | 120/ OK | 115/ OK | 115/ OK | 110/ OK |
| Image density (density/judgment) | 1.18/ OK | 1.15/ OK | 1.13/ OK | 1.02/ OK | 0.99/ NG |
| Recovering performance (judgment) | OK | OK | OK | OK | OK |

TABLE 10

| Composition of ink | Comparative Example 22 | Example 20 | Example 21 | Example 22 | Example 23 | Comparative Example 24 |
|---|---|---|---|---|---|---|
| Pigment dispersion (% by mass) | 24.0 | 24.0 | 24.0 | 24.0 | 24.0 | 24.0 |
| High penetrating agent (kind/% by mass) | d/0.3 | d/0.5 | d/1.0 | d/2.0 | d/2.5 | d/3.0 |
| Penetrating agent (% by mass) | 3.0 | 3.0 | 3.0 | 3.0 | 3.0 | 3.0 |
| Solution stabilizer (% by mass) | 5.0 | 5.0 | 5.0 | 5.0 | 5.0 | 5.0 |
| Glycerin (% by mass) | 15.0 | 15.0 | 15.0 | 15.0 | 15.0 | 15.0 |
| PDO (% by mass) | 20.0 | 20.0 | 20.0 | 20.0 | 20.0 | 20.0 |
| Ion exchanged water (% by mass) | 32.7 | 32.5 | 32.0 | 31.0 | 30.5 | 30.0 |
| Offset (area rate/judgment) | 0.032/ NG | 0025/ OK | 0.018/ OK | 0.014/ OK | 0.012/ OK | 0.010/ OK |
| Intermittent ejection performanc (evaluation/ judgment) | 125/ OK | 120/ OK | 115/ OK | 115/ OK | 110/ OK | 105/ OK |
| Image density (density/judgment) | 1.15/ OK | 1.13/ OK | 1.09/ OK | 1.04/ OK | 1.00/ OK | 0.96/ NG |
| Recovering performanc (judgment) | OK | OK | OK | OK | OK | NG |

According to Table 9 and Table 10, it is understood that there was no problem in the intermittent ejection performance and recovering performance and an image having a desired density could be formed while suppressing the pollution of the recording medium due to offset, by using the ink of any one of Examples 17 to 23 in which the content of each of the penetrating agents c and d that are each an alkyl-substituted 1,3-hexanediol or alkyl-substituted 1,3-pentanediol each having 8 carbon atoms was 0.5 to 2.5% by mass and the total amount of the contents of the high penetrating agent and penetrating agent was within the range of 2 to 5.5% by mass.

On the other hand, it is understood that the pollution of the recording medium due to offset occurs easily by using the ink of Comparative Example 20 or Comparative Example 22 in which the content of the high penetrating agent c or d is small. Furthermore, it is understood that the ink penetrates too significantly into the recording medium and thus an image having a desired image density is difficult to be formed by using the ink of Comparative Example 21 or 24 in which the content of the penetrating agent c or d was high. In addition, since the content of the penetrating agent d was high in the ink of Comparative Example 24, when the ink of Comparative Example 24 was used, the penetrating agent d was solidified during the test of the recovering performance and thus the recovering performance was judged as NG.

Examples 24 to 28, Comparative Examples 25 and Comparative Example 26

The inks of Examples 24 to 28, Comparative Examples 25 and Comparative Example 26 were each obtained by homogeneously mixing the pigment dispersion prepared in Reference Example 2, a high penetrating agent, a penetrating agent, a dissolution stabilizer (2-pyrrolidone), glycerin, 1,3-propanediol and ion-exchanged water in the amounts described in Table 11 by stirring with a stirrer (a three-one motor BL-600 (manufactured by As One Corporation)) at a rotation number of 400 rpm, and filtering the mixture by a filter having a pore diameter of 5 μm.

As the high penetrating agent, 2-ethyl-1,3-hexanediol that is an alkyl-substituted 1,3-hexanediol having 8 carbon atoms was used. Furthermore, as the penetrating agent, triethylene glycol monobutyl ether that is a C1-C4 monoalkyl ether of a polyhydric alcohol was used.

The results of the evaluation of the offset, intermittent ejection performance, and image density of the obtained inks of Examples 24 to 28, Comparative Examples 25 and Comparative Example 26 are shown in Table 10.

be adjusted by increasing the content of the high penetrating agent, and the intermittent ejection performance can also be improved by increasing the content of the 1,3-propanediol. Therefore, an image having a desired image density can be formed even by using the ink containing the pigment by an amount of lower than 4% by mass, and the image turbulence in the case when an image is formed after the ejection of the ink from the recording head has been stopped for a while and the pollution of the recording medium due to offset can be suppressed even by using the ink containing the pigment by an amount of 9.5% by mass or more.

What is claimed is:

1. An ink for an inkjet recording apparatus comprising at least water, a pigment, a high penetrating agent, a penetrating agent and a moisturizing agent, wherein

TABLE 11

|  | Comparative Example 25 | Example 24 | Example 25 | Example 26 | Example 27 | Example 28 | Comparative Example 26 |
|---|---|---|---|---|---|---|---|
| Concentration of pigment in ink (% by mass) | 3.0 | 4.0 | 6.0 | 7.5 | 8.5 | 9.5 | 10 |
| Composition of ink |  |  |  |  |  |  |  |
| Pigment dispersion (% by mass) | 12.0 | 16.0 | 24.0 | 30.0 | 34.0 | 38.0 | 40.0 |
| High penetrating agent (% by mass) | 1.0 | 1.0 | 1.0 | 1.0 | 1.0 | 1.0 | 1.0 |
| Penetrating agent (% by mass) | 3.0 | 3.0 | 3.0 | 3.0 | 3.0 | 3.0 | 3.0 |
| Solution stabilizer (% by mass) | 5.0 | 5.0 | 5.0 | 5.0 | 5.0 | 5.0 | 5.0 |
| Glycerin (% by mass) | 15.0 | 15.0 | 15.0 | 14.0 | 12.0 | 10.0 | 7.0 |
| PDO (% by mass) | 20.0 | 20.0 | 20.0 | 20.0 | 20.0 | 20.0 | 20.0 |
| Ion exchanged water (% by mass) | 44.0 | 40.0 | 32.0 | 27.0 | 25.0 | 23.0 | 24.0 |
| Offset (area rate/judgment) | 0.013/ OK | 0016/ OK | 0.018/ OK | 0.023/ OK | 0.026/ OK | 0.029/ OK | 0.032/ NG |
| Intermittent ejection performance (evaluation/judgment) | 125/ OK | 120/ OK | 115/ OK | 110/ OK | 105/OK | 100/OK | 95/ NG |
| Image density (density/judgment) | 0.98/ NG | 1.03/ OK | 1.10/ OK | 1.13/ OK | 1.15/OK | 1.17/OK | 1.20/ OK |

According to Table 11, it is understood that the image turbulence in the case when an image is formed after the ejection of the ink from the recording head has been stopped for a while and the pollution of the recording medium due to offset are suppressed easily and an image having a desired image density is formed easily by using the ink of any one of Examples 24 to 28 in which the concentration of the pigment in the ink was 4.0 to 9.5% by mass.

However, as explained below, the content of the pigment in the ink is not limited to 4.0 to % by 9.5 mass.

In Table 11, the inks in which the contents of the pigment are 3% by mass and 10% by mass, respectively, are defined as Comparative Examples. However, with respect to the ink, the image density of the formed image can be adjusted to some extents by the kind of the pigment, the method for the preparation of the pigment dispersion and the like, the susceptibility of the recording medium to pollution due to offset can also the high penetrating agent is an alkyl-substituted 1,3-hexanediol or an alkyl-substituted 1,3-pentanediol each having 8 carbon atoms, the content of the high penetrating agent in the ink is 0.5 to 2.5% by mass, the penetrating agent is a diethylene glycol monomethyl ether or one or more member selected from the group consisting of diethylene glycol monohexyl ether, diethylene glycol mono-2-ethylhexyl ether and diethylene glycol dibutyl ether, the total amount of the contents of the high penetrating agent and penetrating agent in the ink is 2 to 5.5% by mass in the case when the penetrating agent is the diethylene glycol monomethyl ether, or 1.5 to 2.5% by mass in the case when the penetrating agent is the one or more member selected from the group consisting of diethylene glycol monohexyl ether, diethylene glycol mono-2-ethylhexyl ether and diethylene glycol dibutyl ether, the moisturizing agent is glycerin and 1,3-propanediol, and
the content of the glycerin in the ink is 5% by mass or more, and the content of the 1,3-propanediol in the ink is 10 to 30% by mass.

2. The ink for an inkjet recording apparatus according to claim 1, wherein the content of the pigment in the ink is 4 to 9.5% by mass.

3. The ink for an inkjet recording apparatus according to claim 1, wherein the high penetrating agent is 2-ethyl-1,3-hexanediol, 2,2,4-trimethyl-1,3-pentanediol, or a mixture thereof.

4. A method for forming an image, comprising forming an image by an inkjet recording apparatus using an ink for an inkjet recording apparatus, wherein
the ink for an inkjet recording apparatus comprising at least water, a pigment, a high penetrating agent, a penetrating agent and a moisturizing agent,
the high penetrating agent is an alkyl-substituted 1,3-hexanediol or an alkyl-substituted 1,3-pentanediol each having 8 carbon atoms,
the content of the high penetrating agent in the ink is 0.5 to 2.5% by mass,
the penetrating agent is a diethylene glycol monomethyl ether or one or more member selected from the group consisting of diethylene glycol monohexyl ether, diethylene glycol mono-2-ethylhexyl ether and diethylene glycol dibutyl ether,
the total amount of the contents of the high penetrating agent and penetrating agent in the ink is 2 to 5.5% by mass in the case when the penetrating agent is the diethylene glycol monomethyl ether, or 1.5 to 2.5% by mass in the case when the penetrating agent is the one or more member selected from the group consisting of diethylene glycol monohexyl ether, diethylene glycol mono-2-ethylhexyl ether and diethylene glycol dibutyl ether,
the moisturizing agent is glycerin and 1,3-propanediol, and
the content of the glycerin in the ink is 5% by mass or more, and the content of the 1,3-propanediol in the ink is 10 to 30% by mass.

5. A method for forming an image, comprising forming an image by an inkjet recording apparatus using the ink for an inkjet recording apparatus according to claim 4, wherein the content of the pigment in the ink is 4 to 9.5% by mass.

6. A method for forming an image, comprising forming an image by an inkjet recording apparatus using the ink for an inkjet recording apparatus according to claim 4, wherein the high penetrating agent is 2-ethyl-1,3-hexanediol, 2,2,4-trimethyl-1,3-pentanediol, or a mixture thereof.

7. The method for forming an image according to claim 4, wherein the time from the landing of a droplet of the ink for an inkjet recording apparatus on a recording medium to the arrival of the landing portion on the recording medium at an ejection part from which the recording medium is ejected is within 1 second in the inkjet recording apparatus.

8. The method for forming an image according to claim 4, wherein the inkjet recording apparatus is a recording apparatus comprising a long line head that is disposed in the direction vertical to the direction to which the recording medium is conveyed.

* * * * *